July 19, 1960 R. F. CASEY 2,946,023

BALANCED MODULATOR

Original Filed Aug. 4, 1954

INVENTOR.
ROBERT F. CASEY

BY Darby & Darby

ATTORNEYS 2,946,023

BALANCED MODULATOR

Robert F. Casey, 22 Prospect Ave., Pompton Plains, N.J.

Continuation of application Ser. No. 447,743, Aug. 4, 1954. This application June 14, 1957, Ser. No. 666,503

22 Claims. (Cl. 332—13)

The present application is a continuation of my prior copending application Serial No. 447,743, filed August 4, 1954, now abandoned.

This invention relates to balanced modulators such as may be used in color television circuits, electronic switching, telemetering, carrier telephone equipment, or single sideband transmission.

The development of color television particularly has increased the need and importance of balanced modulators. Where previously their use has been primarily in electronic switching and carrier telephone equipment, their particular characteristics now indicate their usefulness in such equipment as color-burst generators, color-bar generators and color-encoders. Color-burst generators and color-bar generators require a type of modulator which is known as a "single-balanced" modulator while the color-encoder requires a "double-balanced" modulator.

Further discussion of the encoder or the aforementioned generators is not required for the purpose of fully understanding the invention herein disclosed, and the description will therefore be directed entirely to the modulator combinations shown diagrammatically in the drawings.

As a primary use of this equipment is in the transmission of color television signals, it follows that good stability, and low distortion, with as low cost as possible, are desirable features.

In view of the aforesaid one object of this invention is to provide single-balanced modulators or double-balanced modulators with improved stability.

Still another object of the invention is to provide such modulators having the characteristic of low distortion.

Other and more detailed objects of the invention will be apparent to those skilled in the art.

In the accompanying drawings.

For purposes of disclosure the term "upvolting" as used herein may be defined as raising the potential but not necessarily to a positive potential. Similarly, "downvolting" means lowering the potential but not necessarily to a negative value.

Since the circuits of this invention are built around the use of gated beam tubes, their pertinent properties will be briefly discussed.

Figure 1:
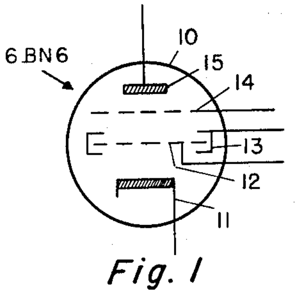
Figure 1 is a schematic representation of a gated beam tube such as that designated by the symbol 6BN6.

The elements of such a tube are diagrammatically illustrated in Figure 1. Within the envelope 10 is the usual cathode 11 and the usual anode or plate 15. Close to the cathode is the first grid 12 which is known as the limiter grid. This grid is located within a cavity having openings to permit the passage of electrons. The element 13 forming this cavity is known as the accelerator. The limiter grid is well shielded from the other elements of the tube and is also better protected from thermal distortion due to cathode heat. Finally, this tube includes another grid 14 called the quadrature grid.

It is a characteristic of this tube structure that within wide limits the cathode current is dependent only on the accelerator voltage, the voltages on the grids and on the plate determining only to which element the current flows. For example, when the limiter grid 12 is downvolted it will divert most of the current to the outside front surface of the accelerator. When the potential of the limiter grid is zero, it will permit most of the electrons to pass through the openings in the accelerator 13 to plate 15. Similiarly, the quadrature grid 14 will determine whether the electrons flow to the back surface of the accelerator, to the plate, or to the grid itself. However, due to the electron-optical properties of this device, the grids may be operated at positive potentials without drawing appreciable current.

As a recapitulation it is noted that the grids independently or in conjunction can control the current distribution between the accelerator 13 and the plate 15, but cannot alter the total cathode current.

Another unusual characteristic of this device becomes apparent under these conditions of use. A true product of multiplication is available. That is, if independent variables are impressed on the grids the true resultant appears at the plate and this holds even for negative values.

While the gated beam tube, such as a 6BN6 will be used in the following description for illustrative purposes, it is well within the scope of one versed in the art to use other tubes equivalent for the same purposes, as for example a 6AR8 sheet beam tube which has separate collector elements corresponding to the accelerator and the anode of the 6BN6 and which uses deflection means rather than diversion means.

Figure 2:
Figure 2 shows a desired waveform for a color-burst or a color-bar.

There is illustrated in Figure 2 the type of waveform required for a color-burst or a color-bar. It is to be noted that a pedestal is undesirable and prior art circuits were preoccupied with eliminating the pedestal introduced as a necessary byproduct.

Figure 3:
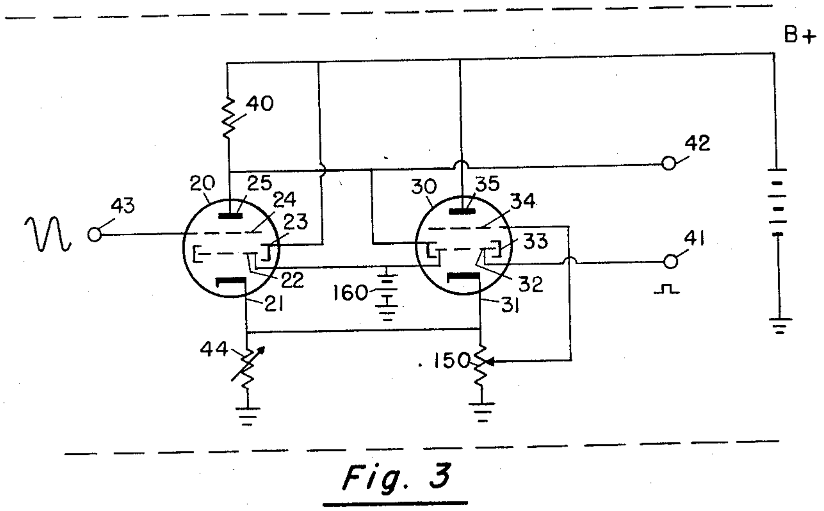
Figure 3 is a schematic and diagrammatic illustration of a single-balanced modulator in accordance with this invention.

Referring now to Figure 3 there is diagrammatically illustrated a single balanced modulator which generates the type of waveform shown in Figure 2. This circuit includes two gated beam tubes 20 and 30 interconnected as shown. Anode 25 of tube 20 is connected through a resistor 40 to the positive side B+ of a suitable voltage source. Anode 35 of tube 30 is directly connected to B+. The quadrature grid 24 is connected to the modulator input terminal 43. The accelerator element 23 is directly connected to B+. The limiter grid 22 of tube 20 is connected to the limiter grid 32 of tube 30. The cathodes 21 and 31 of these tubes are connected to ground, the former through a variable resistor 44 and the latter through a potentiometer 150 whose movable contact is directly connected to the quadrature grid 34. It will be noted that the cathodes are directly interconnected as shown. The accelerator electrode 33 is directly connected to anode 25 of the tube 20 and to the final output terminal 42. The limiter grid 32 is also connected to a gating signal input terminal 41.

The following preliminary considerations will help to explain the overall operation of this circuit. If the limiter grid 22 is negative the cathode current $I_{20}$ of tube 20 would flow to the accelerator 23 and thence directly to B+, and of course would cause no voltage drop in resistor 40. If limiter grid 22 were positive the full value of the cathode current $I_{20}$ would be diverted to flow to anode 25 and thence through resistor 40 to B+. Conversely in tube 30 a negative potential applied to limiter grid 32 would cause its cathode current $I_{30}$ to flow to accelerator 33, and thence through resistor 40 to B+. On the other hand, if limiter grid 32 is positive $I_{30}$ would be diverted to flow to anode 35, and thence directly to B+.

In summary when a negative potential is applied to the limiter grids, $I_{30}$ flows through resistor 40, and when a positive potential is applied to the limiter grids, $I_{20}$ flows through resistor 40. Thus when these currents are equal the resistor 40 has a constant voltage drop across it.

The currents may be made equal in several ways. First by biasing the limiter grids which can be done by introducing a suitable voltage source 160 between them and ground as shown. Second by biasing the quadrature grid which can be done by adjusting the potentiometer 150, and third by introducing an adjustable cathode load resistor which is accomplished by the resistor 44.

Thus, in Figure 3 these three ways are all illustrated since they can be used individually or in any desired combination to effect the required current balance.

In actual practice the limiter grids are not driven negative to cutoff but are merely downvolted. The net effect is the same, as will be understood by those skilled in the art. If limiter grids 22 and 32 are downvolted the current through accelerators 23 and 33 is increased while the current through anodes 25 and 35 is decreased the same amount. With regard to resistor 40, the increase of current from accelerator 33 compensates for the decrease of current at anode 25.

If the transconductance of the two tubes were exactly equal at all times, a gating pulse in the absence of a modulating signal would cause no change in the output circuit. In practice, this change is small; a distortion of less than 1% is obtained as compared with the distortion of 10% to 15% in prior art circuits devised for similar uses.

It has been seen that as far as the limiter grid 22 is concerned, tube 20 is conductive during a positive-going pulse. Therefore, if a modulating signal is impressed on its quadrature grid 24 a modulated output without a change in direct current level would be obtained for the duration of the pulse. At this point it may be noted that by the simple modification of transferring the resistor 40 to the connection to anode 35 a negative-going pulse could be used.

From the foregoing description it will be seen, therefore, that when a positive-going pulse is applied to the terminal 41 and a modulating input signal is applied to the terminal 43, the desired modulated output, which is a product of the two signals, will appear at terminal 42.

Figure 4:
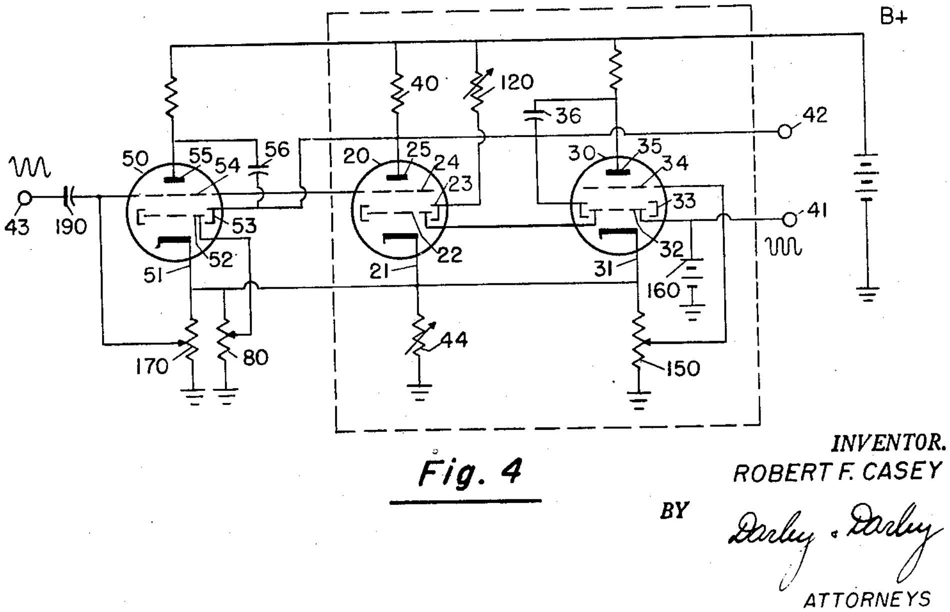
Figure 4 is a similar illustration of a double-balanced modulator in accordance with this invention.

In the circuit of Figure 4 there is diagrammatically illustrated a double balanced product modulator. Since an important application of a circuit of this type would be in the color encoder of a television station, applicable terms will be used in explaining the circuit.

A sub-carrier frequency is to be modulated by color information designated by "I" and "Q" and the sub-carrier is to be suppressed. First it is to be noted that with minor exceptions the operation of the circuit within the dotted rectangle of Figure 4 is exactly the same as the circuit of Figure 3, and therefore the same reference numerals have been applied thereto and the circuit connections will not be repeated. The first exception is the presence of a variable resistor 120 in the connection to the accelerator electrode 23 for obtaining the potential applied thereto. However, in this arrangement a sub-carrier frequency is being used, as distinguished from the single pulse arrangement previously described. However, with the use of a sub-carrier frequency applied to the input terminal 41 the operation of this portion of the circuit is the same as previously described, to wit, voltage variations applied at the input terminal 41 have no effect at the output terminal 42, that is, the input sub-carrier frequency is suppressed.

In addition, however, a third gated beam tube, namely the tube 50 is employed. Its anode 55 is connected to B+ through a resistor, its quadrature grid 54 is connected to quadrature grid 24 and to the modulating signal input terminal 43' through a coupling condenser 190. Its accelerator element 53 is directly connected to anode 25 and its limiting grid is connected to ground through a resistor 80, its upper end being connected to the cathodes 51 and 21. Cathode 51 is grounded through a resistor 170 having a movable contact which is connected to grid 54. In the operation of this circuit let us first consider only tubes 20 and 50. It will be seen that if quadrature grids 24 and 54 are negative the cathode current $I_{50}$ will flow to the accelerator 53 and thence through resistor 40, while cathode current $I_{20}$ will be diverted to accelerator 23 and then to B+. Similarly, if quadrature grids 24 and 54 are positive $I_{20}$ will flow to anode 25 and thence through resistor 40, while $I_{50}$ will flow to anode 55, bypassing resistor 40, and thence to B+. As above, upvolting and downvolting are actually utilized instead of cut-off, but the net result is the same, no change of current through resistor 40. Thus, the signal applied to the input terminal 43', be it I or Q, does not appear at the output terminal 42. That is, it is suppressed.

However, at any given instant the current to anode 25 is dependent upon the instantaneous voltages of limiter grid 22 and quadrature grid 24. Thus, the instantaneous current in resistor 40 is the product of the sub-carrier frequency and the I or Q frequency containing the desired color information and the resultant appears at output terminal 42. Thus, this modulator provides the desired result, namely a suppressed sub-carrier, suppressed color information frequency, and the production of two side bands.

One additional factor must be considered, arising because a continuously varying waveform is applied to limiter grid 32 and quadrature grid 54. This varying voltage is transmitted by the inherent tube capacitance of the tubes to the respective accelerators 33 and 53, which are directly connected to the output terminal 42. In order to overcome this difficulty, anode 35 is interconnected with the output circuit through a capacitor 36 and anode 55 is similarly connected through a capacitor 56. These provide negative feedback loops between the plates and accelerators of the tubes 30 and 50 respectively.

As will be apparent to those skilled in the art there are other electron tubes available and still others which may be developed, which can be used for the purposes of this invention. For this reason it is not intended that the language used in the claims for the purpose of distinguishing one electrode from the other be read to be limited to beam tubes. Any multi-electron tube in which the electrodes when properly connected in circuit in accordance with this invention perform the same or substantially similar functions is intended to be within the scope of this invention.

While one embodiment of this invention has been shown for each of the two types of modulators described, it will be apparent to those skilled in the art that changes may be made without departing from the novel combinations herein set forth. I prefer, therefore, not to be limited to the illustrative examples herein given, but only as required by the appended claims.

What is claimed is:

1. A stable balanced modulator comprising in combination a pair of electron tubes each having a cathode, an accelerator electrode, a limiter grid, a quadrature grid and an anode, a source of operating potential for said tubes, the anode of the first tube being directly connected to said source, and the anode of the second tube being connected to said source through a resistor, a connection between said limiter grids, a connection from the accelerator electrode of said second tube to said source, a gating signal input connection to the limiter grid of said first tube, a connection from the quadrature grid of said first tube to its cathode, a modulation signal input connection to the quadrature grid of said second tube, and an output circuit connected to the anode of said second tube and the accelerator electrode of said first tube.

2. In the combination of claim 1, an adjustable resistor in the cathode lead of said second tube.

3. In the combination of claim 1, the connection between the quadrature grid of said first tube and its cathode including a potentiometer.

4. In the combination of claim 1, means for applying a positive potential to said limiter grids.

5. In the combination of claim 1, a variable resistor in the cathode lead of said second tube and a potentiometer in the connection from the quadrature grid of said first tube to its cathode.

6. In the combination of claim 1, a third electron tube having a cathode, an accelerator electrode, a limiter grid, a quadrature grid and an anode, a connection from said source to the anode of said third tube, a connection from the quadrature grid of said third tube to the quadrature grid of said second tube, a connection from the accelerator electrode of said third tube to said output circuit, a connection from the quadrature grid of said third tube to its cathode, and a connection from the limiter grid of said third tube to its cathode.

7. In the combination of claim 1, a third electron tube having a cathode, an accelerator electrode, a limiter grid, a quadrature grid and an anode, a connection from said source to the anode of said third tube, a connection from the quadrature grid of said third tube to the quadrature grid of said second tube, a connection from the accelerator electrode of said third tube to said output circuit, a connection from the quadrature grid of said third tube to its cathode, and a connection from the limiter grid of said third tube to its cathode including a potentiometer.

8. In the combination of claim 1, a third electron tube having a cathode, an accelerator electrode, a limiter grid, a quadrature grid and an anode, a connection from said source to the anode of said third tube, a connection from the quadrature grid of said third tube to the quadrature grid of said second tube, a connection from the accelerator electrode of said third tube to said output circuit, a connection from the quadrature grid of said third tube to its cathode, and a connection from the limiter grid of said third tube to its cathode, the connection between said quadrature grid of said third tube and its cathode including a potentiometer.

9. In the combination of claim 1, a third electron tube having a cathode, an accelerator electrode, a limiter grid, a quadrature grid and an anode, a connection from said source to the anode of said third tube, a connection from the quadrature grid of said third tube to the quadrature grid of said second tube, a connection from the accelerator electrode of said third tube to said output circuit, a connection from the quadrature grid of said third tube to its cathode, a connection from the limiter grid of said third tube to its cathode, and a connection including a capacitor from the anode of said third tube to its quadrature grid, and a connection from the anode of said first tube to its accelerator electrode including a capacitor.

10. In the combination of claim 1, a third electron tube having a cathode, an accelerator electrode, a limiter grid, a quadrature grid and an anode, a connection from said source to the anode of said third tube, a connection from the quadrature grid of said third tube to the quadrature grid of said second tube, a connection from the accelerator electrode of said third tube to said output circuit, a connection from the quadrature grid of said third tube to its cathode, and a connection from the limiter grid of said third tube to its cathode, the connection of the accelerator electrode of the second tube to said source including a variable resistor.

11. In the combination of claim 1, said electron tubes being beam tubes.

12. In the combination of claim 1, said electron tubes being gated beam tubes.

13. In the combination of claim 1, said beam tubes being sheet beam tubes.

14. A stable balanced modulator comprising, in combination, a pair of electron tubes each having a cathode, a first control electrode, a second control electrode, and a first and second electron collecting electrode; a source of operating potential, said first electron collecting electrode of one of said pair of tubes being connected to said source; a resistor connecting the first electron collecting electrode of the other of said pair of tubes to said source; a connection from the second electron collecting electrode of said one of said pair of tubes to the first electron collecting electrode of said other of said pair of tubes at its junction with said resistor; a connection between the first control electrodes of said pair of tubes; a gating signal input connection to said first control electrodes of said pair of tubes, a connection from the second control electrode of said one tube to a source of biasing voltage; a modulation signal input connection to the second control electrode of said other tube of said pair; and an output circuit connected to the junction of said resistor and the first electron collecting electrode of said other tube.

15. In the combination of claim 14, means for applying a positive potential to said first control electrode.

16. In the combination of claim 14, an adjustable resistor in the cathode leads of said tubes.

17. The combination of claim 16, in which said source of biasing voltage comprises a potentiometer connected in parallel with said adjustable resistor, the arm of said potentiometer being connected to the second control electrode of said one tube.

18. A stable balanced modulator comprising, in combination, three electron tubes each having a cathode, a first control electrode, a second control electrode, and a first and second electron collecting electrode; a source of operating potential; a connection between said first electron collecting electrode of a first one of said tubes and said source; a load resistor connecting the first electron collecting electrode of a second one of said tubes to said source; a connection from the second electron collecting electrode of said first one of said tubes to the first electron collecting electrode of said second one of said tubes at its junction with said resistor; a connection between the first electron collecting electrode of said third tube and said source; a connection between the second electron collecting electrode of said third tube and the junction of said resistor and said first electron collecting electrode of said second tube; a connection between the first control electrodes of said first and second tubes; a first signal source connected to said last named connection to energize said first control electrodes; a connection between said second control electrodes of said second and third tubes; a second source of signal voltage connected to said last named connection to energize said second control electrodes of said second and third tubes; a connection between said second control electrode of said first tube and a first source of biasing voltage; a connection between said first control electrode of said third tube and a source of biasing voltage; and an output circuit connected to the junction of said resistor and said first electron collecting electrode of said second tube.

19. The combination of claim 18, in which the connection between said first electron collecting electrode of a first one of said tubes and said source is a resistor; and a neutralizing condenser connecting said first electron collecting electrode to said second electron collecting electrode of said first one of said tubes to feed back to said second electron collecting electrode a neutralizing signal.

20. The combination of claim 18 including, in addition, a distortion balancing resistor connected between the second electron collecting electrode of said second one of said tubes and said source.

21. A balanced modulator comprising: a first tube having an anode, electron beam-producing means, a first beam-control electrode, and a second beam-control electrode; a second tube having an anode, electron beam-producing means and a first beam-control electrode; means causing said tubes to produce equal amplitude but oppositely phased output signals at said respective anodes, said means comprising means to apply an input signal to said first beam-control electrodes of said tubes; an output circuit connected to said anode of said first tube; means to apply a second input signal to said second beam-control electrode, whereby said output signal at said first anode is modulated; means to apply said output signal from said second anode to said output circuit to eliminate said unmodulated output signal at said first anode, whereby only said modulation appears at said output circuit.

22. A first tube having an anode, electron beam producing means, a first beam-control electrode, and a second beam-control electrode; a second tube having a first beam-control electrode; means causing said first and second tubes to produce equal but opposite output signals when a first input signal is applied to said first beam-control electrodes; an output circuit; means applying said output signals to said output circuit, whereby they counteract each other to produce no change in said output circuit; a third tube having a second beam-control electrode; means causing said first and third tubes to produce equal but opposite output signals when a second input signal is applied to said second beam-control electrodes; means to apply said signals from said first and third tubes to said output circuit, whereby they counteract each other so that neither input signal appears at said output circuit but each modulates the current flowing through said first tube.

References Cited in the file of this patent

UNITED STATES PATENTS

| | | |
|---|---|---|
| 2,204,061 | Andrieu | June 11, 1940 |
| 2,443,754 | Vale | June 22, 1948 |
| 2,500,480 | White | Mar. 14, 1950 |
| 2,500,807 | Jager et al. | Mar. 14, 1950 |
| 2,600,873 | Holloway | June 17, 1952 |
| 2,856,586 | Newsom et al. | Oct. 14, 1958 |

UNITED STATES PATENT OFFICE

CERTIFICATE OF CORRECTION

Patent No. 2,946,023 July 19, 1960

Robert F. Casey

It is hereby certified that error appears in the above numbered patent requiring correction and that the said Letters Patent should read as corrected below.

In the grant, lines 1, 2 and 3, for "Robert F. Casey, of Pompton Plains, New Jersey," read -- Robert F. Casey, of Pompton Plains, New Jersey, assignor to Allen B. Du Mont Laboratories, Inc., of Clifton, New Jersey, a corporation of Delaware, --; line 12, for "Robert F. Casey, his heirs" read -- Allen B. Du Mont Laboratories, Inc., its successors --; in the heading to the printed specification, line 3, for "Robert F. Casey, 22 Prospect Ave., Pompton Plains, N. J." read -- Robert F. Casey, Pompton Plains, N. J., assignor to Allen B. Du Mont Laboratories, Inc., Clifton, N. J., a corporation of Delaware --.

Signed and sealed this 27th day of December 1960.

(SEAL)
Attest:

KARL H. AXLINE
Attesting Officer

ROBERT C. WATSON
Commissioner of Patents